United States Patent
Boss et al.

(10) Patent No.: US 9,983,645 B2
(45) Date of Patent: May 29, 2018

(54) MANAGING ELECTRICAL POWER IN A VIRTUAL POWER DELIVERY NETWORK

(75) Inventors: Gregory J. Boss, Saginaw, MI (US); Andrew R. Jones, Round Rock, TX (US); P. Daniel Kangas, Raleigh, NC (US); Kevin C. McConnell, Austin, TX (US); John E. Moore, Jr., Brownsburg, IN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1407 days.

(21) Appl. No.: 12/825,904

(22) Filed: Jun. 29, 2010

(65) Prior Publication Data

US 2011/0320832 A1    Dec. 29, 2011

(51) Int. Cl.
    *G06F 1/00*        (2006.01)
    *G06F 1/26*        (2006.01)
    *G06F 1/32*        (2006.01)
    *H02J 3/14*        (2006.01)

(52) U.S. Cl.
    CPC ............ *G06F 1/266* (2013.01); *G06F 1/3209* (2013.01); *H02J 3/14* (2013.01); *H02J 2003/146* (2013.01); *Y02B 70/3225* (2013.01); *Y02B 90/226* (2013.01); *Y04S 20/16* (2013.01); *Y04S 20/222* (2013.01); *Y04S 20/224* (2013.01)

(58) Field of Classification Search
    CPC ...................................... G06F 1/32; G06F 1/26
    USPC ................................................. 713/300, 320
    See application file for complete search history.

(56) References Cited

U.S. PATENT DOCUMENTS

| | | | |
|---|---|---|---|
| 5,045,769 A | 9/1991 | Everett, Jr. | |
| 6,100,670 A | 8/2000 | Levesque | |
| 6,160,376 A | 12/2000 | Kumar et al. | |
| 6,331,761 B1 | 12/2001 | Kumar et al. | |
| 6,768,286 B2 | 7/2004 | Trembley | |
| 7,576,517 B1 | 8/2009 | Cotton et al. | |
| 8,674,823 B1 * | 3/2014 | Contario | H02J 1/10 340/333 |
| 2003/0120959 A1 * | 6/2003 | Bohrer | G06F 1/263 713/320 |
| 2005/0038614 A1 | 2/2005 | Botts et al. | |
| 2005/0049729 A1 * | 3/2005 | Culbert | G06F 1/206 700/50 |
| 2005/0200332 A1 * | 9/2005 | Kangas et al. | 320/128 |
| 2008/0167088 A1 * | 7/2008 | Rabu | G06F 1/1632 455/573 |
| 2008/0312852 A1 | 12/2008 | Maack | |
| 2009/0144001 A1 * | 6/2009 | Leonard et al. | 702/63 |
| 2009/0237032 A1 | 9/2009 | Nam et al. | |

(Continued)

*Primary Examiner* — Austin Hicks
(74) *Attorney, Agent, or Firm* — Lisa Ulrich; Andrew M. Calderon; Roberts Mlotkowski Safran Cole & Calderon, P.C.

(57) ABSTRACT

Systems and methods are provided for managing power to devices in a virtual power delivery network, using a centralized power allocation controller. The method of managing power consumption of a plurality of devices includes receiving device information from one or more devices connected in a virtual power delivery network. The method further includes managing power consumption of the one or more devices in the virtual power delivery network based on the received device information.

25 Claims, 4 Drawing Sheets

(56) References Cited

U.S. PATENT DOCUMENTS

2009/0274064 A1* 11/2009 Schoettle ............... H04B 3/542
  370/254
2011/0130885 A1* 6/2011 Bowen ..................... B60L 3/12
  700/291
2011/0320828 A1* 12/2011 Boss et al. .................... 713/300

* cited by examiner

MANAGING ELECTRICAL POWER IN A VIRTUAL POWER DELIVERY NETWORK

TECHNICAL FIELD

The invention is directed to systems and methods for power management and, more particularly, to systems and methods for managing power to devices in a virtual power delivery network, using a centralized power allocation controller.

BACKGROUND

Mobile computing devices such as laptop computers, portable digital assistants (PDAs), etc. are commonly used in business to increase worker productivity, increase communications capabilities and generally increase overall worker efficiency. These same types of devices are also used by countless millions of people for personal use such as to download information from the Internet. Importantly, these mobile computing devices are powered on batteries, which are recharged by A/C adapter power supplies.

It is not uncommon to use the internal power source, e.g., battery, of the device, whether it is for business or personal use. However, batteries in mobile computing devices have limited capacity (time) and have to be recharged periodically or they will power down unexpectedly which, in turn, can lead to loss of information. To recharge the battery, it is necessary for the user to plug the device into an A/C power source. These devices, though, begin to consume electricity with other devices on the electrical grid, such as computers, servers, appliances, etc. This places a drain on the grid, and may not use electricity in the most efficient manner. For example, the mobile devices may be plugged into the electric outlet during peak usage times, resulting in the batteries being charged at the highest possible costs (when they could have been charged at another time).

SUMMARY

In a first aspect of the invention, a method of managing power consumption of a plurality of devices comprises receiving device information from one or more devices connected in a virtual power delivery network. The method further comprises managing power consumption of the one or more devices in the virtual power delivery network based on the received device information.

In another aspect of the invention, a system of delivering power to a plurality of devices comprises a central power allocation controller comprising at least hardware and software components. The central power allocation controller receives device information from devices in a virtual power delivery network and, based on the received device information, manages power consumption of the devices in the virtual power delivery network.

In still another aspect of the invention, a computer system for managing power consumption in a virtual power delivery network. The system comprises a processor, a computer readable memory and a computer readable storage media. First program instructions set up or recognize a plurality of devices that make up a virtual power delivery network. Second program instructions receive device information from the devices electrically connected in a virtual power delivery network. Third program instructions manage the power consumption of the devices in the virtual power delivery network using the device information. The first, second and third program instructions are stored on the computer readable storage media for execution by the processor via the computer readable memory.

In yet another aspect of the invention, a computer program product is provided for managing power in a virtual power delivery network. The computer program product comprises a computer readable storage media. First program instructions receive device information from devices electrically connected in a virtual power delivery network. Second program instructions manage the power consumption of the devices in the virtual power delivery network using the device information. The first and second program instructions are stored on the computer readable storage media.

In still another aspect of the invention, a method of deploying a system for managing power consumption for a plurality of devices comprises providing a computer infrastructure. The computer infrastructure is operable to: receive device information from one or more devices connected in a virtual power delivery network; and manage power consumption of the one or more devices in the virtual power delivery network based on the received device information.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
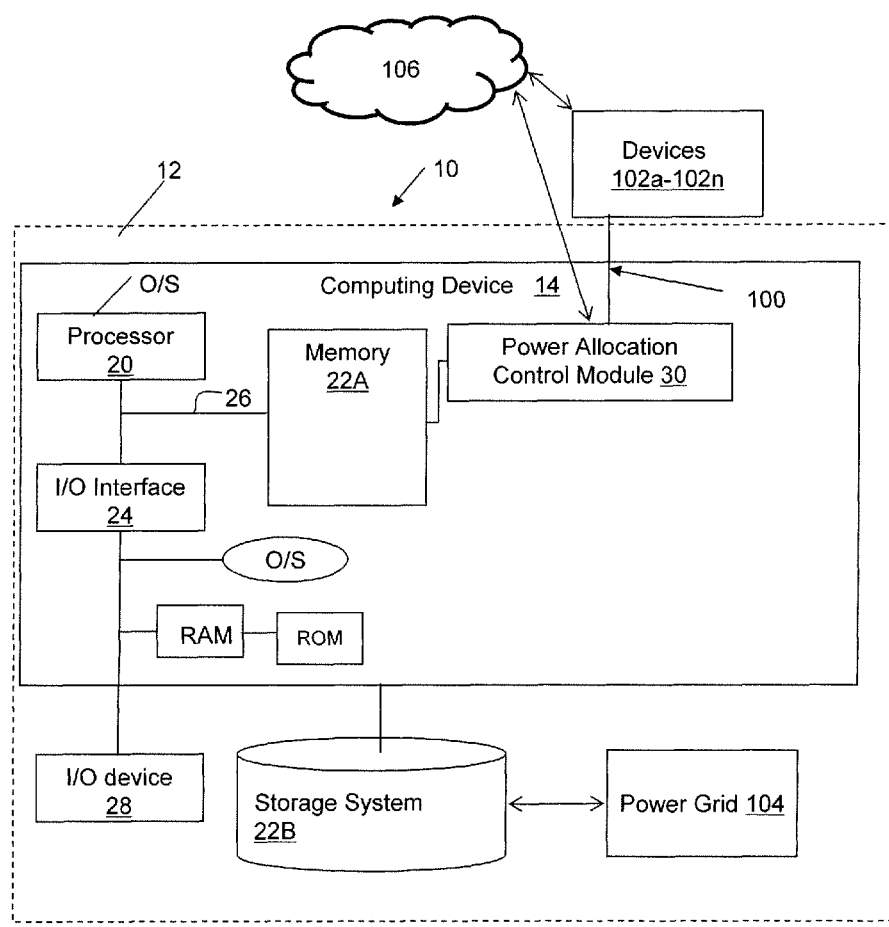
FIG. 1 shows an illustrative environment for implementing the systems and methods in accordance with aspects of the invention.

The invention is directed to systems and methods for power management and, more particularly, to systems and methods for managing power to devices using a centralized network power allocation controller. In embodiments, the power allocation controller (PAC) is capable of controlling charging characteristics of devices in a virtual power delivery network. The virtual power delivery network can be virtually any combination of devices within a certain location such as, for example, within a building, on a floor of the building, within a certain location within a building, devices on a certain power grid, multiple buildings, etc. The virtual network of devices can include, for example, any type of computing device such as multiple laptops and other mobile devices that are capable of communicating over a network with the power allocation controller. The computing devices can also be other devices in which power consumption can be controlled by the power allocation controller, e.g., printers, gaming consoles, etc.

In embodiments, the power allocation controller can exchange (or at least receive) information with the devices to activate and/or manage the power consumption of the devices for specific times and durations. Several methods dictating the communication, identification and authorization of charging rights of the virtual power delivery network are contemplated by the present invention.

In more specific embodiments, devices that are on the virtual power delivery network can have their power allocation remotely controlled by the power allocation controller. For example, charging of batteries of certain mobile devices can be monitored and controlled by the power allocation controller in order to ensure that the total power consumption of the devices on the virtual power delivery network do not exceed a predetermined voltage and/or current requirement (threshold requirement). In further embodiments, the power allocation controller can control power delivery based on type of device (e.g., priority devices), user, time of day usage (e.g., charge batteries of certain devices during low power consumption times (night) vs. high power consumption times), and/or a combination thereof with or without other parameters or combinations of parameters. By way of example, a high security device such as, for example, a computer with sensitive subject matter may have priority over a printer or gaming console. In this case, the power allocation controller will ensure that the battery of the computer on the virtual power delivery network will always remain charged, and then allocate power consumption on other devices accordingly.

In further embodiments, the devices can be identified through the virtual power delivery network by the power allocation controller network. This identification can be transmitted from the devices and received by the power allocation controller by wireless or wired communications, such as, for example, a LAN or through other known methods (e.g., 802.3 wired, 802.11b/g wireless, 802.16 WiMAX, 3G, etc.). The information can be polled periodically by the power allocation controller and can include, for example, but not limited to, BIOS information, user information, location information or other desired/requested information needed to manage power consumption. The other information may include, for example, (i) computer configuration information; (ii) registry information; (iii) hardware configuration information; and/or (iv) software configuration information, any of which can assist in power management decisions. These power management decisions may include, for example, powering devices, charging batteries, or placing devices into sleep or hibernation mode, depending on the priorities and current power consumption over the virtual power delivery network. The power management decisions can be provided to the devices, for example, using a code, which is decoded by the devices and acted upon, accordingly.

The methods and systems of the present invention provide many advantages over conventional systems. For example, it is now possible to centralize control of power consumption to level or balance power usage across an enterprise such as, for example, a central site (campus), building, floor or even room level. The methods and systems of the present invention can be extended to controlling any AC or DC power delivery system in addition to battery charging stations. The methods and systems of the present invention also increase user productivity by eliminating uncharged mobile devices and concern for finding a power source since the power allocation controller can ensure that the device remains charged, even if not at 100%. This, in turn, may eliminate the use of external power adapters. The methods and systems of the present invention can also be implemented as a set of instructions (PAC codes) provided to one or more users of the system of the present invention. In further embodiments, all or some of the logic (e.g., determination of power requirements) can be handled by the power allocation controller.

FIG. 1 shows an illustrative module that can implement the processes of the invention. For example, the power allocation controller (PAC) 10 includes a power allocation control module 30 for managing the processes in accordance with the invention. To this extent, the power allocation control module 30 is operable to identify, discover, and balance power consumption to devices 102a-102n, e.g., process described herein. The power allocation control module 30 is connected to the devices 102a-102n by communications channel 100 as discussed in more detail below.

The power allocation controller 10 is shown connected to a database 22B, which may be internal or external. In embodiments, the database 22B can also be connected directly to the power allocation control module 30. The database 22B may include a look up table to determine charging priorities and/or requirements for each of the devices 102a-102n, based on the device information (which can be provided through the power allocation control module 30 or devices themselves), as well as power grid information (peak usage times, cost of electricity for current and future times of the day, etc.). The device information can include, for example, BIOS information, the type of device, battery charging requirements, registry information, hardware configuration, software configuration, sleep mode requirements, current or historic usage of the device, location information and other information that may be needed in order to balance or manage the power consumption of the devices 102a-102n. The information can be polled periodically by the power allocation controller 10.

The database 22B may also receive information from the power grid 104, which includes peak power usages, energy costs for certain times of the day and other power management information. All or a combination of this information can be used by the power allocation control module 30 to make power consumption decisions for each of the devices 102a-102n.

In embodiments, the power allocation control module 30 is configured and/or operable to manage all of the device 102a-102n in a virtual power delivery network represented by reference numeral 106. In embodiments, the virtual power delivery network 106 includes devices 102a-102n, in addition to the power allocation controller 10. The virtual power delivery networks 106 can be set up or provided by the power allocation controller 10 or a third party service provided, for example.

In embodiments, the connected devices 102a-102n can transmit the power requirements directly to the power allocation control module 30 by the communication channel 100 (wireless, LAN, through the AC connection, etc.). Alternatively or in combination with other embodiments, the connected devices 102a-102n can provide this information to another device (e.g., control device), which would act as an intermediary with the power allocation control module 30.

In further embodiments, the devices 102a-102n can provide system requirements and/or identification information from its BIOS, for example, to the power allocation control module 30 which, in turn, can look up the appropriate power requirements that are stored in the database (storage 22B) (e.g., within a look-up table). In still other embodiments, the power allocation control module 30 can determine power requirements (e.g., power needed to charge a battery or maintain the device in a sleep mode, to name a few different requirements) by polling the devices 102a-102n in the virtual power delivery network 106 at periodic times such as, for example, every hour.

In still other embodiments, the power allocation control module 30 can determine the amount of power it can supply to the connected devices 102a-102n based on total power consumption in the virtual power delivery network 106, total allocated energy costs for a time of day, priority of the devices that need power, and/or time of day usage or other parameters as discussed herein. For example, the power allocation control module 30 can charge a battery of a device 102n based on a current low battery indication, while placing another device in sleep mode, and allowing another device to have a low battery, since it has been detected as being plugged in but not in use, all based on a total allowed energy consumption usage for the virtual power delivery network 106. In this way, the power allocation control module 30 can control and/or manage which devices receive power, and for what period of time in order to manage the power consumption of the entire virtual power delivery network 106. Another priority may include charging batteries of the lowest capacity over others with higher capacity. The goal in this priority is to keep as many devices as possible operating. This is power balancing of minimum device capacity as compared with balancing maximum power usage of the available charging power on the power allocation controller 10.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any users of portable computing devices, etc. In return, the service provider can receive payment from the customer(s) under a subscription and/or fee agreement and/or the service provider can receive payment from the sale of advertising content to one or more third parties.

The control module 10 can be implemented on a computing device 14 which includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S). The computing device 14 is in communication with the external I/O device/resource 28 and the storage system (database) 22B.

In general, the processor 20 executes computer program code, which can be stored in the memory 22A and/or storage system 22B. The power allocation control module 30 can be implemented as one or more program code stored in memory 22A as separate or combined modules. Additionally, the power allocation control module 30 may be implemented as separate dedicated processor to provide the function of this tool. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, and/or
a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any storage medium that can contain, store, communicate, propagate, or transport the program for use by or in connection with the instruction execution system, apparatus, or device. The computer-usable storage medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

Figure 2:
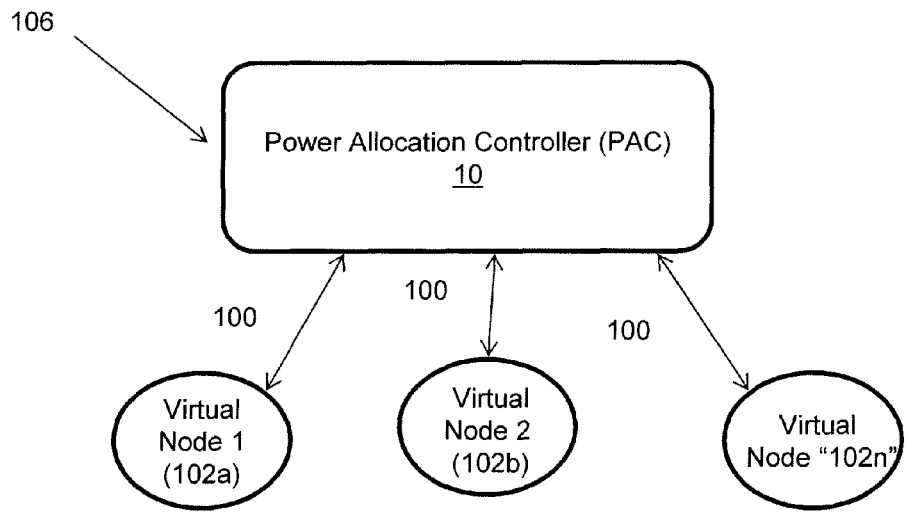
FIG. 2 shows a virtual power delivery network in accordance with aspects of the invention.

FIG. 2 shows an exemplary virtual power delivery network 106 in accordance with aspects of the invention. More specifically, the virtual power delivery network 106 includes devices 102a-102n and the power allocation controller 10. In embodiments, the virtual power delivery network 106 is a collection of devices 102a, 102b, 102n in a physical location using certain such as, for example, a building, floor, campus, etc. The virtual power delivery network 106 includes the power allocation controller 10, which communicates with the devices 102a, 102b, 102n by way of e.g., LAN communications software, Ethernet or other communications link 100 as described above. In embodiments, the devices 102a, 102b, 102n can be connected to a single charging brick or station operating in a client fashion in the virtual power delivery network 106.

In embodiments, the power allocation controller 10 maintains the virtual power delivery network 106, which may be grouped devices (as previously described). The virtual power delivery network 106 will communicate with the devices 102a, 102b, 102n via a charging station or individually. In embodiments, the virtual power delivery network 106 knows each device on the virtual power delivery network 106, which can be provided by a polling mechanism, or the devices actively providing their location and other information to the power allocation controller 10 through the virtual power delivery network 106. In this way, the power allocation controller 10 will know, for example, which devices are on the virtual power delivery network 106, charging power budget for each device or group of devices, and other information such as charging priority, current and/or historic usage, type of device and hardware and/or software configuration, etc.

With some combination of this information, the power allocation controller 10 can, for example amongst other features, provides:

Power balancing delivered power to not exceed client charging station requirements;
Power limiting of devices within the virtual network to not exceed mobile device charging characteristics;
Priority charging scheduling based on type of device (e.g., heart monitor vs. gaming console), user of device (e.g., doctor vs. casual user of device), dedicated services of the device (medical vs. gaming), etc.; and/or Power balancing based on "Environmentally Friendly Policy" set for power usage of a certain site, building, room, group of devices, etc.

In further embodiments, the devices 102a, 102b, 102c can report their physical location and a unique ID to the power allocation controller 10. The physical location of the devices can be provided by RF signaling, GPS methodologies or known triangulation methods, for example. The physical location can be used to determine the location and hence used for management of the devices on separate or same virtual power delivery networks. The ID may be an Ethernet MAC address or unique ID reported by the devices, e.g., smart battery, or a combination of these and other identification factors as described herein. In further embodiments, an AC charger (e.g., brick) or client charger can incorporate a unique ID code which is also transmitted to the power allocation controller 10 by various communication mechanisms as described herein.

In further embodiments, the devices can be periodically configured by the power allocation controller 10 with a dynamic code (PAC code) that includes device priority status for obtaining charging power. The code can be generated by the power allocation controller and sent to the devices for the devices to manage their own power consumption, e.g., when to charge a battery, when to hibernate, etc. More specifically, the PAC code can determines if and how much charge power (or current) the device will draw from a charger or on the virtual power delivery network 106. In embodiments, the PAC code can be based on a priority mechanism managed by the power allocation controller 10 for determining what power level each device can obtain from the charger or on the virtual power delivery network 106.

Figure 3:
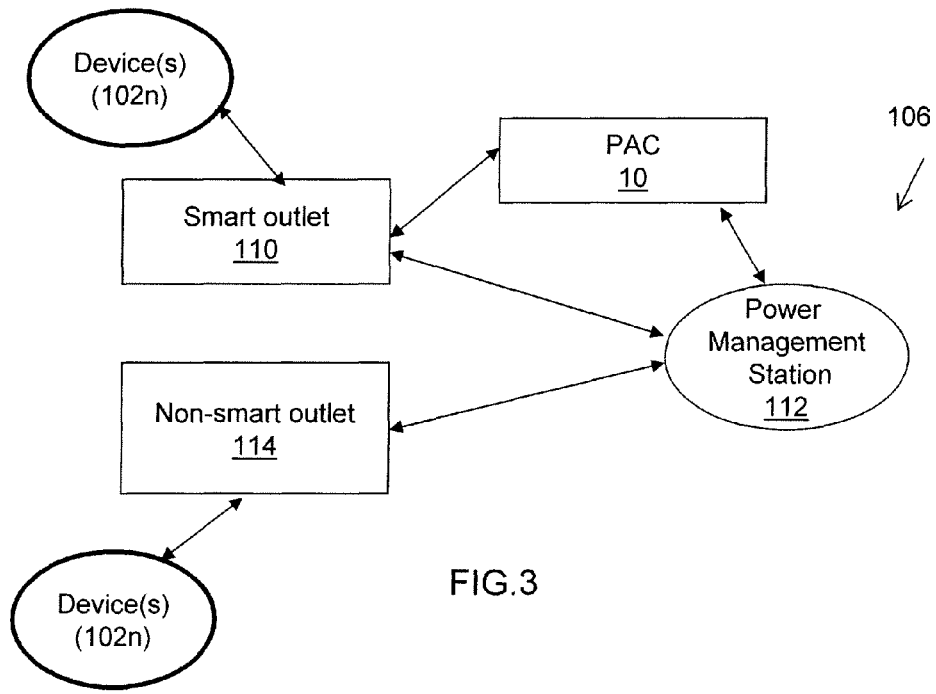
FIG. 3 shows another a virtual power delivery network in accordance with aspects of the invention.

FIG. 3 shows an exemplary virtual power delivery network 106 in accordance with aspects of the invention. In this embodiment, the power allocation controller 10 is connected in the virtual power delivery network 106 to a smart outlet 110 and a power management station 112. The power management station 112 can be connected to the smart outlet 110 and a non-smart outlet 114 (e.g., a conventional outlet that does not contain any programmable logic). The smart outlet 110 and the non-smart outlet 114 can be connected to one or more devices 102n. The smart outlet 110 and the non-smart outlet 114 provide power to the devices 102n, which may be managed by the power allocation controller 10 and/or power management station 112. In embodiments, the smart outlet 112 can be a smart charger, for example.

In embodiments, the power management station 112 and the smart outlet 112 can provide device information to the power allocation controller 10 through a wire or wireless communication link. More specifically, in embodiments, the devices can communicate with the smart outlet 110, non-smart outlet 114, power management station 112 and/or the power allocation controller 10 via a communication link which may be, for example, a LAN or even an AC signaling modulation over an AC/DC power line. In turn, the power allocation controller 10 can provide instructions for power management to the power management station 112 and the smart outlet 112 for managing and/or balancing power consumption by each of the devices.

More specifically, in embodiments, the smart outlet 110 includes logic that is configured to distribute and/or manage power to devices. The smart outlet 110, in embodiments, can optionally act as a network switch and provide network connectivity between the devices 102n and the power allocation controller 10. For example, the logic of the smart outlet 110 can be programmed with the amount of power and/or other requirements for power management for each device 102n connected to the smart outlet 110. As noted above, this is possible by receiving location and ID information from the devices 102n.

Accordingly, in an illustrative example, the smart outlet 110 can act as an intermediary between the devices 102n and the power allocation controller 10. For example, the devices 102n can communicate their power requirements, priorities, ID information, set up configurations and other information to the smart outlet 110 (in addition to or alternatively to the information described herein). In turn, the smart outlet 110 can provide this information to the power allocation controller 10. The power allocation controller 10 can then manage the power consumption of the devices based on the information provided.

In an alternative or additional embodiments, the smart outlet 110 can include logic that is equivalent to or supplements that of the power allocation controller 10. In this way, the smart outlet 110 can manage the power to each of the devices connected thereto, in a local virtual power delivery network. In this way, the smart outlet 110 can place devices in sleep mode or other lower power consumption mode, as well as determine power delivery to each of the devices based on the priorities, power costs, power consumption allotted to the each of the devices and/or the virtual power delivery network and/or requirements of the devices 102n, as provided by the power allocation controller 10.

In embodiments, the smart outlet 110 (and/or non-smart outlet 114) can be programmed by or receive instructions from the power management station 112 (or power allocation controller 10) with the power management information for each of the devices, e.g., how much power each device may consume for a certain period of time. In further embodiments, the power management station 112 can determine the power consumption needs of the devices connected to the non-smart outlet 114, at a local level. This can be accomplished in the same manner as with the power allocation controller 10 (e.g., same logic as in the power allocation controller 10).

Much like with the smart outlet 110, the devices can transmit any of the information described herein to the power management station 112. In turn, the power management station 112 can act as a local power allocation controller, in order to allocate and/or manage power consumption. This can be accomplished by communicating and/or receiving instructions directly from the power allocation controller 10. Alternatively or in addition, the power allocation controller 10 can manage the power consumption of the devices through the power management station 112, which can provide all pertinent information (e.g., charging requirements, etc.) of the devices to the power allocation controller 10.

In further embodiments, smart battery parameters or other power management decisions can be programmed with PAC code limits, provided by the power allocation controller 10, power management station 112 or the smart outlet 110. In this way, the devices 102n will only draw power from a charger, for example, according to the allocated amount which may be zero power. In embodiments, the PAC code can also place any of devices into a sleep or hibernation mode, depending on its current usage, when it was last used (e.g., not used with the last 5 minutes, etc.). In more specific embodiments, multiple and variable charge power factors can be calculated by the power allocation controller 10 and placed into a single PAC code used to configure the non-smart outlet 114, the smart outlet 110 and/or power management station 112, amongst other features described herein. The data encoded into PAC Code is transmitted to devices, non-smart outlet 114, the smart outlet 110 and/or power management station 112, whereby it is decoded and describes how the device must draw power (power level, time period, duration, etc.) to meet the overall power usage policy set by the power allocation controller 10. In embodiments, the devices, non-smart outlet 114, smart outlet 110 and/or power management station 112, can use the PAC code to meet the overall power consumption of any or all of the devices. For example, a device can have a smart battery which can allocate its own power consumption for charging based on the PAC Code, e.g., allocate its power consumption budget based on the PAC Code.

Figure 4:
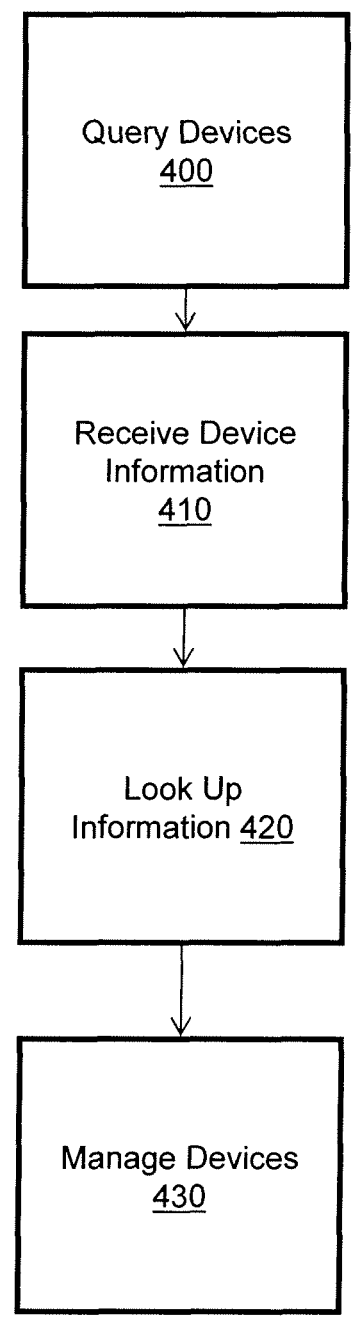
FIGS. 4 and 5 show flow diagrams implementing processes in accordance with aspects of the invention.
Figure 5:
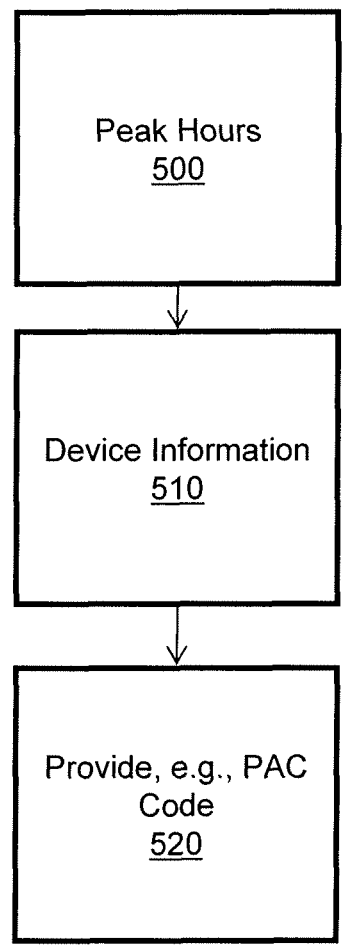

FIGS. 4 and 5 show an exemplary flow for performing aspects of the present invention. The steps of FIGS. 4 and 5 may be implemented in the environment of FIG. 1, for example. The flow diagram may equally represent a high-level block diagram or a swim-lane diagram of the invention. The flowchart and/or block diagram in FIGS. 4 and 5 (and any other flowcharts and/or block diagrams) illustrates the architecture, functionality, and operation of possible implementations of systems, methods and computer program products according to various embodiments of the present invention. In this regard, each block in any of the flowcharts, block diagrams or swim-lane diagrams may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disc—read/write (CD-R/W) and DVD.

FIG. 4 shows a flow for managing power consumption based on the devices connected to the power allocation controller, in accordance with aspects of the invention. It should be understood that the management of the power consumption may also be performed by the power management station and/or smart outlet, with or without instructions from the power allocation controller. In the latter case, the logic of the power management station and/or smart outlet can be the same as the power allocation controller, but implemented on a local level (local virtual power delivery network). Accordingly, although FIG. 4 (and FIG. 5) is discussed with reference to the power allocation controller, one of skill in the art should understand that the processes described herein are equally applicable to the other components herein.

More specifically, at step 400, the power allocation controller queries the devices for information. At step 410, the power allocation controller receives information from the devices. This information can be, for example, power consumption requirements, battery type and/or charge, device configuration, etc., as described herein In embodiments, the devices can also provide location information via GPS, RF and/or triangulation methods. At step 420, the power allocation controller, once the information is received, looks up the power consumption requirements of the device in a look up table. The power consumption requirements may be based on the received information and other priorities such as, for example, always ensuring that power is supplied to certain devices (e.g., medical devices). More specifically, in case of power failures or brown outs, the power allocation controller will ensure that critical systems still remain powered up such as, for example, medical devices and security equipment to name a few. In embodiments, the power allocation controller can also update the look up table with the information received from the devices.

At step 430, the power allocation controller adjusts power consumption based on the received information. In embodiments, the power consumption may also be adjusted based on total allotted power consumption for a particular virtual power delivery network and/or total allotted costs allowed for power consumption for a particular (or plural) power delivery networks.

FIG. 5 shows another process in accordance with the invention, directed to "Environmentally Friendly" policies. For example, at step 500, the power allocation controller determines the peak hours of usage (e.g., most expensive time of day to consume electricity) for each of the virtual delivery power networks. At step 510, the power allocation controller determines the types, locations and power consumption requirements of the devices connected to the virtual delivery power networks, as well as other information, if applicable. This information can include, for example, current and historic usage of the devices, current battery levels of the devices, location of the devices, etc. Based on this information, the power allocation controller can manage the power consumption of each of the devices, perhaps through PAC codes, at step 520. For example, depending on the time of day and cost of the electricity, the power allocation controller may perform, as illustrative examples, the following operations/funnctions/instructions/determinations:

(i) Charge batteries when peak usage and hence costs are at their lowest;
(ii) Place a device in sleep mode when the device is not being used and when there is peak usage on the grid and hence costs are at their highest;
(iii) Do not charge any batteries, unless they are on a priority, e.g., medical devices, security devices, etc. at peak usage times;
(iv) Minimize power consumption of devices when there is peak usage on the grid and hence costs are at their highest;
(v) Run only those devices that are absolutely necessary, e.g., medical devices, security devices, based on their priorities, when there is peak usage on the grid and hence costs are at their highest; and/or
(vi) Ensure that a total power consumption of the devices in the virtual power delivery network do not exceed a predetermined voltage and/or current requirement (threshold requirement).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method of managing power consumption of a plurality of devices, comprising:
receiving device information from one or more devices connected in a virtual power delivery network;
managing power consumption of the one or more devices in the virtual power delivery network based on the received device information,
wherein the device information is transmitted through an outlet that wirelessly interfaces with the one or more devices and charges the one or more devices, and the device information is polled periodically by a centralized power allocation controller;
controlling power delivery to the one or more devices based on a combination of parameters comprising a type of a device, a user of the device and a time of day usage of the device; and
programming the plurality of devices with code limits provided by the centralized power allocation controller for power management decisions, wherein the code limits comprise a code which indicates a power consumption level that the one or more devices can obtain from the virtual power delivery network.

2. The method of claim 1, wherein:
the device information is received by the centralized power allocation controller that has logic for managing the power consumption; and
the virtual power delivery network includes any combination of devices within a certain location.

3. The method of claim 1, wherein the managing comprises remote power balancing of the devices within the virtual power delivery network which comprises ensuring that a total power consumption of the devices in the virtual power delivery network do not exceed a predetermined threshold.

4. The method of claim 1, wherein the type of device comprises a priority assigned to the device.

5. The method of claim 1, wherein the device information includes at least one of BIOS information, user information, location information, computer configuration information, registry information, hardware configuration information, and software configuration information.

6. The method of claim 1, wherein the managing comprises at least one of charging batteries and placing one or more of the devices into sleep or hibernation mode, depending on priorities and current power consumption over the virtual power delivery network.

7. The method of claim 1, wherein the managing comprises looking up in a look up table charging priorities and/or requirements for each of the devices and applying the charging priorities and/or requirements for balancing power consumption.

8. The method of claim 7, wherein the look up table includes received information from a power grid, which includes peak power usages and energy costs for certain times of the day.

9. The method of claim 1, wherein the managing comprises determining an amount of power that can be supplied to the devices based on at least one of total power consumption in the virtual power delivery network, total allocated energy costs for a time of day, priority of the devices that need power, and time of day usage.

10. The method of claim 1, wherein the managing comprises providing the code limits to the one or more devices for managing its own power consumption, wherein the code further comprises a device priority status for obtaining charging power and determining if and how much charge power the device will draw from a charger or on the virtual power delivery network.

11. The method of claim 1, further comprising receiving a physical location of the devices.

12. The method of claim 1, wherein a service provider, on a subscription, advertising, and/or fee basis, manages the power requirements for each of the devices.

13. A method of claim 1, wherein the receiving device information from one or more devices connected in a virtual power delivery network comprises receiving the device information transmitted by the one or more devices via a communication channel.

14. A system of delivering power to a plurality of devices, comprising:
a central power allocation controller comprising at least hardware and software components, the central power allocation controller receiving device information which indicates a power balancing policy at a location from devices located in multiple buildings in a virtual power delivery network and actively providing their location to the central power allocation controller through the virtual power delivery network by at least one of GPS, RF and triangulation, and, based on the received device information, managing power consumption of the devices in the virtual power delivery network by implementing the power balancing policy at the location of a device, wherein the central power allocation controller periodically polls the devices for the device information, and the devices are periodically configured with codes which indicates a power consumption level that the devices can obtain from the virtual power delivery network; and
an outlet that charges the devices and transmits the device information from the devices to the central power allocation controller by wirelessly interfacing with the devices.

15. The system of claim 14, wherein the central power allocation controller generates and sends the codes to the devices to manage its power within the virtual power delivery network.

16. The system of claim 14, wherein the central power allocation controller provides remote power balancing of the devices within the virtual power delivery network which comprises ensuring that a total power consumption of the devices in the virtual power delivery network do not exceed a predetermined threshold requirement.

17. The system of claim 14, wherein the central power allocation controller budgets power consumption of the devices based on a priority associated with each of the devices within the virtual power delivery network.

18. The system of claim 14, wherein the outlet serves as an intermediate component that sends the device information wirelessly to the central power allocation controller.

19. The system of claim 14, further comprising a database that includes power consumption information based on the device information and electric grid information, wherein the central power allocation controller looks up in the database charging priorities and/or requirements for balancing power consumption of the devices in the virtual power delivery network.

20. The system of claim 14, wherein the central power allocation controller determines an amount of power that can be supplied to the devices based on at least one of total power consumption in the virtual power delivery network, total allocated energy costs for a time of day, priority of the devices that need power, and time of day usage.

21. A computer system for managing power consumption in a virtual power delivery network, the system comprising:
a processor, a computer readable memory and a computer readable storage media;
first program instructions to set up or recognize a plurality of devices that make up a virtual power delivery network;
second program instructions to receive device information indicating a user of a device of the plurality of devices, a device type of the device and a power balancing policy at a location of the device, the device information is polled periodically by a centralized power allocation controller from the devices electrically connected in a virtual power delivery network;
third program instructions to manage the power consumption of the devices in the virtual power delivery network using the device information based on the user of the device, the device type and the power balancing policy at the location of the device;

fourth program instructions to periodically configure the devices with a code which indicates a power consumption level that the devices can obtain from the virtual power delivery network;

fifth program instructions to control an outlet that wirelessly interfaces with the devices to provide connectivity between the devices and the central power allocation controller; and sixth program instructions to charge the devices by a charger in the virtual power delivery network having a unique ID code which is transmitted to the centralized power allocation controller, wherein the first, second, third, fourth, fifth and sixth program instructions are stored on the computer readable storage media for execution by the processor via the computer readable memory.

22. The computer system of claim 21, wherein the third program instructions determines an amount of power that can be supplied to the devices based on at least one of total power consumption in the virtual power delivery network, total allocated energy costs for a time of day, priority of the devices that need power, and time of day usage.

23. The computer system of claim 21, wherein the third program instructions generates and sends the code from the outlet to the devices for the devices to manage their own power consumption level.

24. A computer program product for managing power in a virtual power delivery network, the computer program product comprising:

a non-transitory computer readable storage media;

first program instructions to receive device information that is polled periodically by a centralized power allocation controller from devices electrically connected in a virtual power delivery network;

second program instructions to manage the power consumption of the devices in the virtual power delivery network using the device information;

third program instructions for a charging outlet that wirelessly interfaces with the devices to transmit through the outlet the device information from the devices to the central power allocation controller; and fourth program instructions to periodically configure the devices with a dynamic code which indicates a power consumption level each device can obtain from the virtual power delivery network, wherein the first, second, third and fourth program instructions are stored on the non-transitory computer readable storage media.

25. A method of deploying a system for managing power consumption for a plurality of devices, comprising:

providing a computer infrastructure, being operable to:

control an outlet that wirelessly interfaces with one or more devices and charges the one or more devices in a virtual power delivery network;

receive device information indicating a user of a device of the plurality of devices, a device type of the device and a power balancing policy at a location of the device, the device information is polled periodically by a centralized power allocation controller from the one or more devices connected in the virtual power delivery network;

manage power consumption of the one or more devices in the virtual power delivery network based on the user of the device, a device type and the power balancing policy at the location of the device from the received device information;

periodically configure the one or more devices with a code which indicates a power consumption level that the one or more devices can obtain from the virtual power delivery network; and balance a power consumption among the one or more devices through both a charging outlet and a smart charging outlet which contains programmable logic.

* * * * *